(12) United States Patent (10) Patent No.: US 9,374,735 B2
Kekki (45) Date of Patent: Jun. 21, 2016

(54) METHOD AND APPARATUS FOR DATA FLOW MANAGEMENT

(75) Inventor: Sami Kekki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 14/391,393

(22) PCT Filed: Apr. 13, 2012

(86) PCT No.: PCT/FI2012/050367
§ 371 (c)(1),
(2), (4) Date: Oct. 9, 2014

(87) PCT Pub. No.: WO2013/153253
PCT Pub. Date: Oct. 17, 2013

(65) Prior Publication Data
US 2015/0319647 A1 Nov. 5, 2015

(51) Int. Cl.
*H04W 28/12* (2009.01)
*H04W 36/34* (2009.01)
*H04W 36/14* (2009.01)
*H04W 36/00* (2009.01)
*H04W 36/28* (2009.01)

(52) U.S. Cl.
CPC .............. *H04W 28/12* (2013.01); *H04W 36/14* (2013.01); *H04W 36/34* (2013.01); *H04W 36/0027* (2013.01); *H04W 36/28* (2013.01)

(58) Field of Classification Search
CPC ..... H04W 28/12; H04W 36/34; H04W 36/14; H04W 36/0027; H04W 36/38
See application file for complete search history.

(56) References Cited

U.S. PATENT DOCUMENTS

| | | | | |
|---|---|---|---|---|
| 2008/0304450 | A1* | 12/2008 | Rexhepi | H04W 36/0033 370/331 |
| 2009/0149189 | A1* | 6/2009 | Sammour | H04L 1/165 455/450 |
| 2010/0075678 | A1* | 3/2010 | Akman | H04L 43/50 455/436 |
| 2010/0172323 | A1* | 7/2010 | Rexhepi | H04W 36/0016 370/331 |
| 2010/0208698 | A1* | 8/2010 | Lu | H04W 36/0027 370/331 |
| 2011/0250888 | A1 | 10/2011 | Ryu et al. | |
| 2011/0310737 | A1* | 12/2011 | Klingenbrunn | H04W 36/0044 370/235 |
| 2011/0310850 | A1* | 12/2011 | Klingenbrunn | H04W 36/30 370/332 |
| 2011/0310851 | A1* | 12/2011 | Klingenbrunn | H04W 76/041 370/332 |
| 2012/0063428 | A1* | 3/2012 | Ng | H04W 36/0016 370/338 |
| 2012/0224578 | A1* | 9/2012 | Mih Ly | H04L 12/4633 370/392 |
| 2013/0088983 | A1* | 4/2013 | Pragada | H04W 16/14 370/252 |
| 2015/0065141 | A1* | 3/2015 | Ma | H04W 36/0033 455/436 |

* cited by examiner

*Primary Examiner* — Ajay Cattungal
(74) *Attorney, Agent, or Firm* — Seppo Laine Oy

(57) ABSTRACT

In accordance with an example embodiment of the present invention, there is provided an apparatus, comprising a memory configured to store a flow management policy, at least one processing core configured to evaluate the flow management policy, while the apparatus is attached to a first radio access technology, to determine a priority order between at least a second and a third radio access technology with respect to at least one first flow active between the apparatus and the first radio access technology, the at least one processing core being further configured to cause at least one of the at least one first flow to be transferred to the third radio access technology responsive to a determination that for the at least one first flow, the third radio access technology is preferable to the second radio access technology, wherein at least one second flow active between the apparatus and the first radio access technology is not caused to be transferred.

11 Claims, 4 Drawing Sheets

METHOD AND APPARATUS FOR DATA FLOW MANAGEMENT

TECHNICAL FIELD

The present application relates generally to management of data flows in wireless communication networks.

BACKGROUND

Wireless communication between electronic devices requires that devices participating in the communication, for example a base station and a mobile station, are configured to conform to an agreed framework for communication. The agreed framework comprises defined procedures that are used to effect the communication in the framework context, wherein the context may comprise for example air interface resources, or radio resources, such as at least one frequency band. Such frameworks may be known as radio access technologies, or RATs. A RAT may be defined in industry standards that device manufacturers can refer to when designing products such that they are capable of communicating according to the RAT.

When standards are used correctly, interoperability between devices from a plurality of suppliers may be achieved. For example, a cellular telephone produced by a first manufacturer may be capable of communicating with a cellular telephone produced by a second manufacturer, using a base station produced by a third manufacturer and a core network produced by a fourth manufacturer.

A mobile station attached to a RAT, in other words a network operating in accordance with the RAT, may form a plurality of separate connections, or flows, to the RAT. For example, a mobile may have concurrently active a voice call and two data flows with different characteristics. The data flows may have requirements that depend on the character of the flows, for example a streaming media flow may require a steady, high bitrate whereas an email updating flow may work with lower bitrate but may have encryption support as a mandatory requirement.

A mobile station may be configured with a policy enabling the mobile to determine for each flow a priority order of available RATs. By evaluating available RATs against the policy and active flows, the mobile may derive for each flow a priority order between the available RATs. Acting on the priority order, a mobile may determine to transfer one or more flows to a more preferable RAT. For example, where the mobile is attached to a cellular RAT with slow datarates and high cost per megabyte, it may determine to transfer a high-bandwidth flow to an available wireless local area network, WLAN, RAT. After the transfer, the mobile may have concurrent flows to more than one RAT.

SUMMARY

Various aspects of examples of the invention are set out in the claims.

According to a first aspect of the present invention, there is provided an apparatus, comprising a memory configured to store a flow management policy, at least one processing core configured to evaluate the flow management policy, while the apparatus is attached to the first radio access technology, to determine a priority order between at least a second and a third radio access technology with respect to at least one first flow active between the apparatus and the first radio access technology, the at least one processing core being further configured to cause at least one of the at least one first flow to be transferred to the third radio access technology responsive to a determination that for the at least one first flow, the third radio access technology is preferable to the second radio access technology, wherein at least one second flow active between the apparatus and the first radio access technology is not caused to be transferred.

According to a second aspect of the present invention, there is provided a method, comprising storing a flow management policy, evaluating the flow management policy in an apparatus, while the apparatus is attached to the first radio access technology, to determine a priority order between at least a second and a third radio access technology with respect to at least one first flow active between the apparatus and the first radio access technology, and causing at least one of the at least one first flow to be transferred to the third radio access technology responsive to a determination that for the at least one first flow, the third radio access technology is preferable to the second radio access technology, wherein at least one second flow active between the apparatus and the first radio access technology is not caused to be transferred.

According to a third aspect of the present invention, there is provided a computer program product comprising a computer-readable medium bearing computer program code embodied therein for use with a computer, the computer program code comprising code for storing a flow management policy, code for evaluating the flow management policy in an apparatus, while the apparatus is attached to the first radio access technology, to determine a priority order between at least a second and a third radio access technology with respect to at least one first flow active between the apparatus and the first radio access technology, and code for causing the at least one first flow to be transferred to the third radio access technology responsive to a determination that for the at least one first flow, the third radio access technology is preferable to the second radio access technology, wherein at least one second flow active between the apparatus and the first radio access technology is not caused to be transferred.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
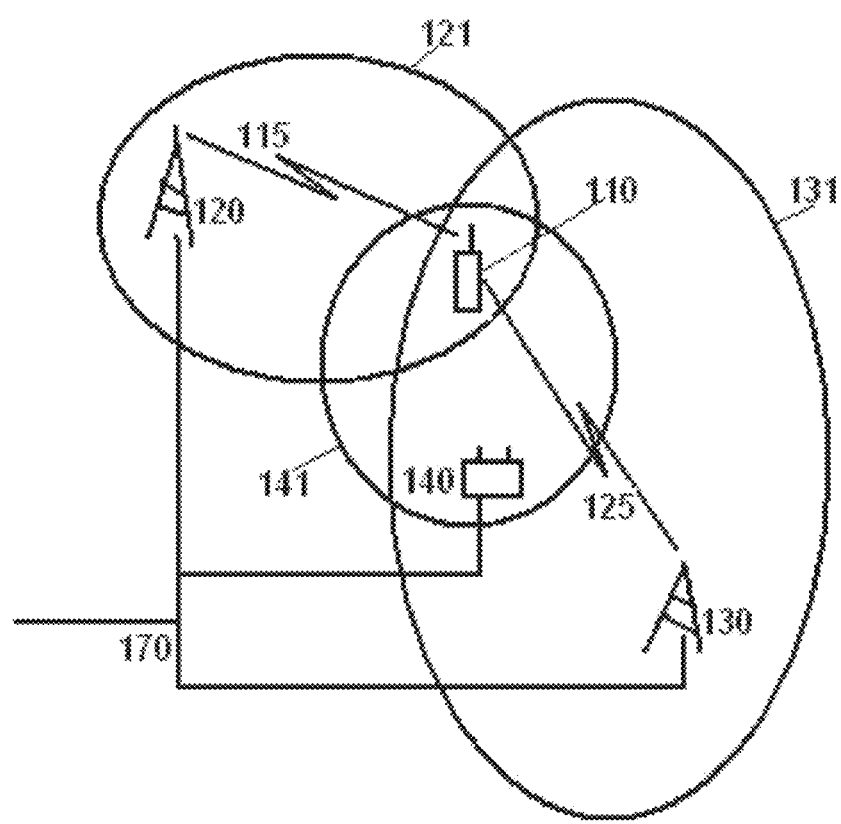
FIG. 1 illustrates an example system capable of supporting at least some embodiments of the invention.

FIG. 1 illustrates an example system capable of supporting at least some embodiments of the invention. Mobile apparatus 110, or mobile 110, for example a mobile phone, personal digital assistant, PDA, cellular phone, palmtop computer, laptop computer, tablet computer or other mobile communications-capable device, is connected to base station 120 by means of a wireless link 115. Wireless link 115 may comprise an uplink capable of conveying information from mobile 110 to base station 120 and a downlink capable of conveying information from base station 120 to mobile 110. Wireless link 115 may be in conformance with a cellular radio-access technology such as, for example, wideband code division multiple access, WCDMA, global system for mobile communications, GSM or long term evolution, LTE, for example. Mobile 110 may be powered by a battery comprised in mobile 110. Device 110 is herein referred to as a mobile, but it is to be understood that the scope of the description encompasses also embodiments where the device is immobile.

Base station 120 may be capable of communicating in accordance with at least one, and in some embodiments more than one, cellular technology such as, for example, those mentioned above. Base station 120 may be powered from a stable power source and may be furnished with a backup battery. Base station 120 may be connected to a core network node, which is not illustrated, by means of network 170. Network 170 may be a wire-line network or, for example, a directional microwave network. A core network node may act as a gateway toward further nodes and may be configured to perform functions relating to controlling a cellular communications network. Examples of such functions include routing, authentication, access control and billing subscribers. Examples of core network nodes include switches, management nodes, serving gateways, support nodes and charging systems. The core network node may connect to further core network nodes, which are also not illustrated in FIG. 1.

Network 170 connects operably also to base station 130 and access point 140. Although network 170 is illustrated as a single network, it is to be understood that in some embodiments it is to be understood more loosely, for example base station 120 may communicate with base station 130 and/or access point 140 via the internet, to which all three are directly or indirectly connected. In particular, access point 140 may be independent of cells 121 and 131 in the sense that it may be controlled by a different operator, even an operator that isn't in a contractual relationship with an operator of base station 120, for example.

Base station 130 may be comprised in a different subnetwork than base station 120, for example base station 120 may be comprised in an LTE network and base station 130 may be comprised in a GSM network, with both the LTE network and the GSM network being comprised in an overall cellular composite network of a cellular operator, for example. In general, base station 130 controls cell 131, which is configured to operate in accordance with a different RAT than cell 121. Cell 121 is controlled by base station 120. Access point 140, which may operate in accordance with, for example, a cellular RAT such as CDMA2000 or a non-cellular RAT such as WLAN, controls cell 141. The term "access point" is used for terminological clarity only, as in some embodiments access point 141 may in fact be a cellular base station. In general, cell 141 operates using a RAT that is different from both the RAT of cell 121 and the RAT of cell 131.

Mobile 110 may be an endpoint for a plurality of flows of different types. The flows may initially be conveyed via wireless link 115, base station 120 and network 170. In this situation, mobile 110 may act in accordance with its policy, which may be stored in a memory comprised in mobile 110. Where cell 121 is a highly capable cell, for example of the LTE technology, it may be according to the policy of mobile 110 the most highly preferred type of cell, or RAT, for each one of the plurality of flows. Alternatively some flows may be routed via access point 140, for example. A flow may have two endpoints, such that at least one of the endpoints may be a mobile device. A flow may comprise data traffic in both directions, or alternatively on only one direction. A flow may use a transport protocol and an associated frame structure to convey information.

Mobile 110 is illustrated as being within the cell coverage area of cell 121 and communicating with base station 120 via wireless link 115. As mobile 110 moves in the cell coverage area of cell 121, it may be configured to conduct measurements of other cells or systems that may be reachable for communication. It may also monitor at least one quality parameter relating to wireless link 115. Mobile 110 may report to base station 120 results of measurements it conducts, to allow base station 120 or another network node to decide on possible handovers. By handover it is meant a transfer of attachment of mobile 110 from a first base station to a second base station. A particular type of handover is a soft handover, where a mobile changes from communicating with a first base station only to communicating with the first and a second base station, for example. Another kind of handover is an inter-radio access technology, inter-RAT, handover where a mobile changes attachment to a new cell that operates in accordance with a different RAT than the previous cell. For example, as cell 131 operates with a different RAT than cell 121, a handover of mobile 110 from cell 121 to cell 131 is an inter-RAT handover.

In some embodiments, a network decides on inter-RAT handovers based at least in part on measurement reports received from a mobile. Responsive to receiving from a network an inter-RAT handover command, a mobile may be constrained to obey the command and participate in the inter-RAT handover to a cell of the new RAT specified in the command. Depending on the RATs involved, and also on how many flows the mobile has active, an inter-RAT handover may be a complicated procedure of transferring each flow routed via the source base station to be routed via the target base station. Since RATs have different properties and capabilities, it is possible in some cases that individual flows cannot be served in the new RAT. For example, where a flow is circuit-switched and the new RAT only offers packet-switched service, the circuit-switched flow has to be converted into packet-switched form or dropped in connection with the inter-RAT handover.

Mobile 110 is in FIG. 1 illustrated as being in the cell coverage areas of each of cells 121, 131 and 141. This means that mobile 110 may in principle be capable of routing flows via any one of base station 120, base station 130 and access point 140. If cell 121 is most preferred for each flow of mobile 110, mobile 110 may be configured to not initiate actions to transfer any of the flows to base station 130 or access point 140 since base station 120 has higher priority for each flow separately, in accordance with a policy of mobile 110. Therefore despite being in a cell coverage area of all three cells 121, 131 and 141, all flows may be routed via cell 121 in line with the policy.

Where mobile 110 roams away from base station 120 and toward base station 130, for example, the network in which base station 120 is comprised in may be configured to initiate an inter-RAT handover with cell 121 as a source cell and cell 131 as a target cell. Initiating the inter-RAT handover may occur responsive to measurement reports received in the network from mobile 110, wherein the measurement reports may indicate that a received signal power measured in mobile 110 trends lower for broadcast signals from base station 120, and trends higher for broadcast signals from base station 130. The inter-RAT handover may comprise causing all flows of mobile 110 that are routed via base station 120 to be re-routed via base station 130, severing wireless connection 115 between mobile 110 and base station 120. As a result of the inter-RAT handover a new wireless connection 125 is formed between mobile 110 and base station 130.

After the inter-RAT handover, it may be the case that mobile 110 determines based on its policy that at least one flow routed via base station 130 is such that cell 131 is less preferred for it than cell 141. Responsive to such a determination, mobile 110 may be configured to initiate transferring of the flow so that it becomes routed via access point 140 rather than base station 130. In other words, for such a flow cell 121 is more preferred than cell 141, and cell 141 is more preferred than cell 131. Such a flow will thus undergo two re-routings: first in the inter-RAT handover from cell 121 to cell 131, and then from cell 131 to cell 141. Whereas in some embodiments mobile 110 isn't capable of deciding on inter-RAT handovers, mobile 110 may still be capable of requesting for individual flows to be re-routed via an available RAT, such as a WLAN RAT, for example. In some cases, cell 131 may be incapable of supporting certain flows previously routed via cell 121. In connection with an inter-RAT handover to cell 131, such flows may have to be dropped.

To avoid such double re-routings of flows, and possible dropped flows, mobile 110 may be configured to predict when the network is likely to issue an inter-RAT handover command. Mobile 110 may be configured to, for example, inspect measurement reports it sends to the network and observe trends in measured properties in the sent measurement reports. Responsive to detecting that the measurement reports sent to the network comprise measured signal strength levels that indicate an imminent or likely inter-RAT handover, mobile 110 may be configured to evaluate its policy to determine, if there are actions it can undertake before the inter-RAT handover.

As another example, mobile 110 may be configured to predict when the network is likely to issue an inter-RAT handover command by compiling statistics of measurements it conducts, wherein the statistics may comprise more or less information than is included in measurement reports. In further embodiments, mobile 110 may be configured to predict when the network is likely to issue an inter-RAT handover command using yet further methods.

To facilitate prediction, the network may be configured to advise mobile 110 concerning an inter-RAT handover algorithm it uses, wherein mobile 110 may predict an inter-RAT handover command with greater accuracy using at least one of information on the algorithm, information from measurement reports and internally compiled statistics.

When evaluating its policy, mobile 110 may determine whether there is an accessible RAT, which is more preferred than the target RAT of the predicted inter-RAT handover for at least one flow routed via the source RAT of the inter-RAT handover. In the example illustrated in FIG. 1, the RAT of cell 141 is more preferred than the RAT of cell 131 for at least one flow. Responsive to such a determination, mobile 110 may be configured to initiate transferring such flows from cell 121 to cell 141 before the inter-RAT handover command arrives from base station 120. When the inter-RAT handover command does arrive, such flows are routed via cell 141 and may be unaffected by the inter-RAT handover. Thus the flows will be in their preferred RAT immediately upon conclusion of the inter-RAT handover, and they need be re-routed only once. Since cell 141 is capable of supporting such flows, the flows will also avoid being dropped due to re-routing to cell 131.

Mobile 110 may have a dedicated policy for using prior to inter-RAT handover, or alternatively mobile 110 may be configured to use its normal policy, wherein mobile 110 would use the normal policy as if it was already in the target RAT to identify flows concerning which the target RAT is less preferred than another available RAT, such as for example that of cell 141.

Transferring flows, or causing them to be re-routed, may comprise, for example, initiating signaling between the source and/or target RATs of the flow transfer in accordance with procedures defined for the RATs and/or their interworking.

In general there is provided an apparatus, such as for example mobile 110 or a control device for inclusion in mobile 110 to control the functioning of mobile 110. An example of a control device is a processor, as discussed hereinbelow in connection with FIG. 2. The apparatus may comprise a memory configured to store a flow management policy, wherein the apparatus is, with the flow management policy, enabled to determine a priority order for RATs for each active or planned flow the apparatus participates in. In detail, using the flow management policy the apparatus may be enabled to select a most preferred RAT for routing each active or planned flow.

The apparatus may comprise at least one processing core, the at least one processing core being configured to evaluate the flow management policy while attached to a first RAT, to determine a priority order between at least a second and third RAT with respect to at least one first flow active between the apparatus and the first RAT. In other words, the apparatus may be configured to derive a priority order between the second and third RATs for at least one flow currently routed via the first RAT. The second and third RATs may be selected based on a determination that the apparatus is currently within coverage areas of both the second and third RAT, respectively.

The at least one processing core may be further configured to cause at least one of the at least one first flow to be transferred, or re-routed, to the third RAT responsive to a determination that for the at least one of the at least one first flow the third RAT is preferable to the second RAT. In other words, after the transferring, or re-routing, the affected flow or flows are routed via the third RAT. In doing so, the apparatus may be configured to leave at least one second flow unchanged, in other words the at least one second flow may remain routed via the first RAT.

In some embodiments, the first RAT is preferable, based on the flow management policy, to the second RAT and to the third RAT for all flows of the apparatus. In other words, at least one of the at least one first flow may thus be caused to be transferred to a less preferred RAT.

In some embodiments, the at least one processing core is configured to determine that an inter-RAT handover from the first RAT to the second RAT is likely. The determination may comprise predicting as described above.

In some embodiments, at least one processing core is configured to evaluate the flow management policy responsive to a determination that an inter-RAT handover from the first RAT to the second RAT is likely. For example, the evaluation may occur responsive to a prediction that the network will shortly issue an inter-RAT handover command.

In some embodiments, the at least one processing core is configured to cause the flow or flows to be transferred to the third RAT before receiving an inter-RAT handover command. In other words, in these embodiments the inter-RAT handover command is anticipated by prediction and at least one flow is re-routed in advance to prevent the inter-RAT handover from applying to the at least one re-routed flow.

In some embodiments, the network may decide when to issue an inter-RAT handover command and mobile 110 may not request an inter-RAT handover from the network. In these embodiments, mobiles may only comply with inter-RAT handover commands they receive. In this sense, mobiles of these embodiments are not competent to decide on initiating an inter-RAT handover. In other words, even though the network decides in initiating an inter-RAT handover involving a mobile based at least in part on measurement reports it receives from the mobile, the mobile may not request an inter-RAT handover as such.

In some embodiments, where the apparatus determines that is has predicted an inter-RAT handover incorrectly, in other words despite a prediction of handover to the second RAT, a handover is instead commanded to a fourth RAT, the apparatus is configured to evaluate the flow management policy after the inter-RAT handover to the fourth RAT is complete, and perform any re-routings of flows necessary. In other words, for example a flow transferred to the third RAT before the inter-RAT handover command to the fourth RAT arrives, may be transferred to the fourth RAT if that is more preferable than the third RAT for the flow concerned.

Figure 3:
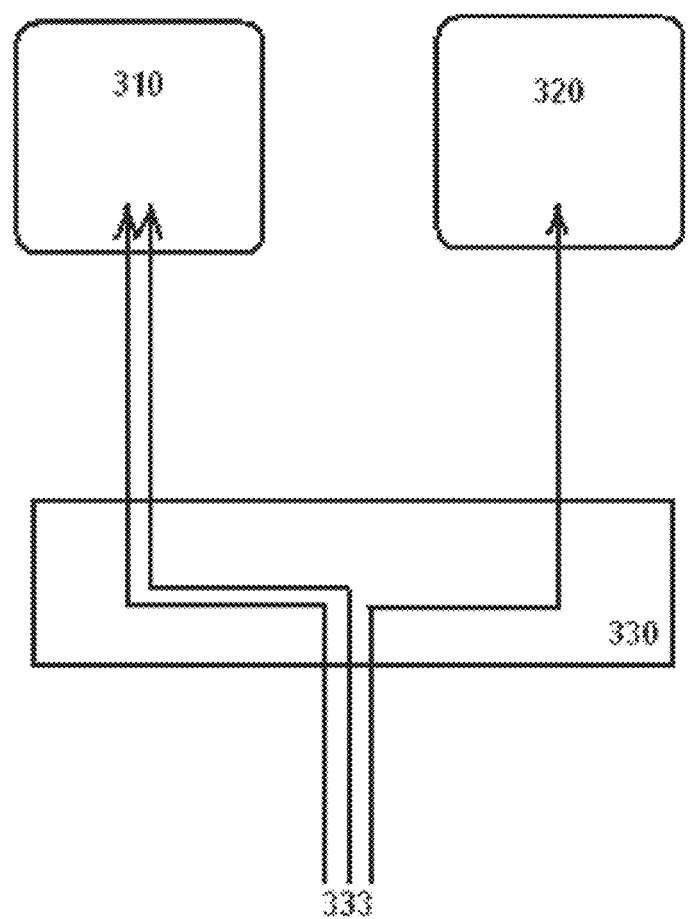
FIG. 3 illustrates schematically routing of flows to different radio access technologies.

FIG. 3 illustrates schematically routing of flows to different radio access technologies. In FIG. 3 is illustrated mobile 330, which may correspond essentially to mobile 110 of FIG. 1. Element 310 corresponds to a base station or access point operating in accordance with a first RAT, and element 320 corresponds to a base station or access point operating in accordance with a second RAT. Three flows 330 originate from mobile 330. Based on a policy stored in mobile 330, each flow is routed via a RAT preferred for the flow. In the illustrated example, the first RAT is more preferred than the second RAT for two flows, and the second RAT is more preferred than the first RAT for one flow.

The policy may be configured in mobile 333 at the factory, or it may be updated dynamically over the air, for example with information from an access network discovery and selection function, ANDSF.

Figure 4:
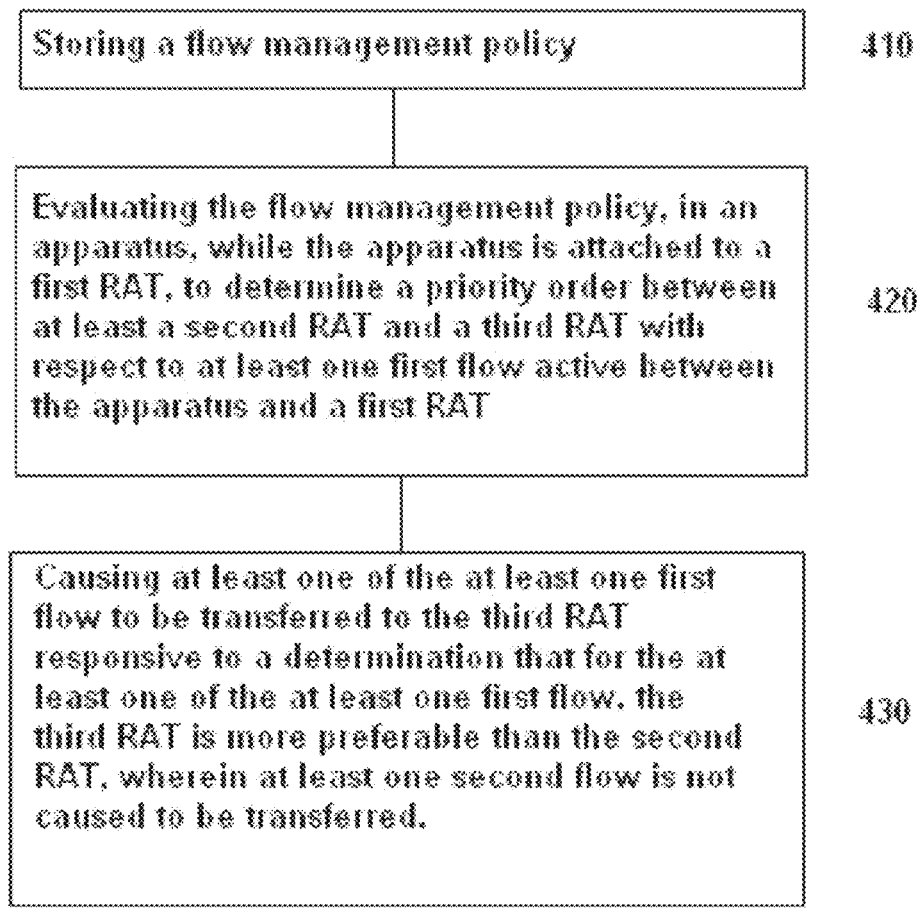
FIG. 4 is a flowchart illustrating an example method in accordance with some embodiments of the invention.

FIG. 4 is a flowchart illustrating an example method in accordance with some embodiments of the invention. The method is performed in an apparatus, for example mobile 110 or a control device therein. In phase 410, a flow management policy is stored, for example in a memory comprised in mobile 110. The storing may be long-term or temporary, for example the policy may be requested from the network when needed and not stored on mobile 110 at other times. Alternatively, mobile 110 may permanently store a policy, which may in some embodiments be updated with information received from the network.

In phase 420, the flow management policy is evaluated, while attached to the first radio access technology, to determine a priority order between at least a second and a third radio access technology with respect to at least one first flow active between the apparatus and the first radio access technology.

In phase 430, at least one of the at least one first flow is caused to be transferred to the third radio access technology responsive to a determination that for the at least one first flow, the third radio access technology is preferable to the second radio access technology, wherein at least one second flow active between the apparatus and the first radio access technology is not caused to be transferred. Causing to be transferred may comprise, for example, initiating signaling between the first and/or third RATs in accordance with procedures defined for the RATs and/or their interworking.

Figure 2:
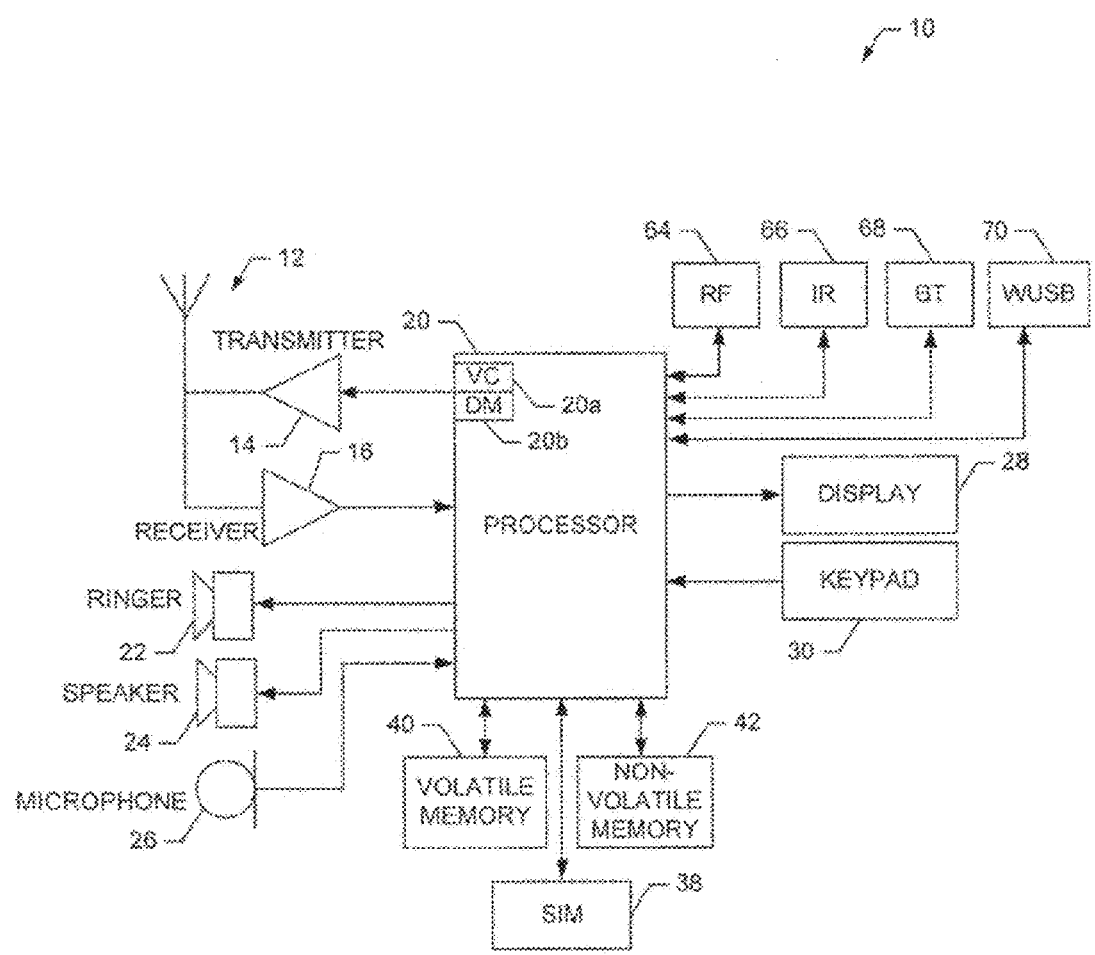
FIG. 2 illustrates a block diagram of an apparatus in accordance with an example embodiment of the invention.

FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. Mobile terminal 10 may be furnished with transmitters and receivers, or transceivers, for more than one cellular RAT. The mobile terminal 10 may also include a processor 20 configured to provide signals to and receive signals from the transmitter and receiver, respectively, and to control the functioning of the apparatus. Processor 10 may be configured to control the functioning of the transmitter and receiver by effecting control signaling via electrical leads to the transmitter and receiver. Likewise processor 10 may be configured to control other elements of apparatus 10 by effecting control signaling via electrical leads connecting processor 10 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service, GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that multiple re-routing of flows in connection with network-directed inter-RAT handover is avoided. Another technical effect of one or more of the example embodiments disclosed herein is that dropped flows may be avoided in connection with network-directed inter-RAT handover.

Embodiments of the present invention may be implemented in software, hardware, application logic or a combination of software, hardware and application logic. The software, application logic and/or hardware may reside on memory, the processor 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a memory configured to store a flow management policy;
at least one processing core configured to, while the apparatus is attached to a first radio access technology, determine that an inter-radio access technology handover of the apparatus from the first radio access technology to a second radio access technology is likely or imminent, and in response to determining the inter-radio access technology handover is likely or imminent, evaluate the flow management policy to determine a priority order between at least the second and a third radio access technology with respect to at least one first flow active between the apparatus and the first radio access technology; and
the at least one processing core being further configured to cause at least one of the at least one first flow to be transferred, before the inter-radio access technology handover, to the third radio access technology responsive to a determination that for the at least one first flow, the third radio access technology has higher priority than the second radio access technology, wherein at least one second flow active between the apparatus and the first radio access technology is not caused to be transferred to the third radio access technology.

2. The apparatus according to claim 1, wherein the first radio access technology is preferable to both the second and the third radio access technologies for the at least one first flow.

3. The apparatus according to claim 1, wherein the apparatus is configured to cause the at least one first flow to be transferred to the third radio access technology before receiving from a network an inter-radio access technology handover command to handover to the second radio access technology.

4. The apparatus according to claim 1, wherein according to the first radio access technology a mobile is not competent to decide on initiating an inter-radio access technology handover, and the apparatus comprises a mobile.

5. The apparatus according to claim 1, wherein responsive to a receiving an inter-radio access technology handover command to another technology than the second radio access technology, the apparatus is configured to evaluate the flow management policy and cause the at least one first flow to be transferred to a most preferred radio access technology after the commanded inter-radio access technology handover is completed.

6. A method, comprising:
storing a flow management policy;
determining, while an apparatus is attached to a first radio access technology, that an inter-radio access technology handover of the apparatus from the first radio access technology to a second radio access technology is likely or imminent, and in response to determining the inter-radio access technology handover is likely or imminent;
evaluating the flow management policy in the apparatus to determine a priority order between at least the second and a third radio access technology with respect to at least one first flow active between the apparatus and the first radio access technology; and
causing at least one of the at least one first flow to be transferred, before the inter-radio access technology handover, to the third radio access technology responsive to a determination that for the at least one first flow, the third radio access technology has higher priority than the second radio access technology, wherein at least one second flow active between the apparatus and the first radio access technology is not caused to be transferred to the third radio access technology.

7. The method according to claim 6, wherein the first radio access technology is preferable to both the second and the third radio access technologies for the at least one first flow.

8. The method according to claim 6, comprising causing the at least one first flow to be transferred to the third radio access technology before receiving from a network an inter-radio access technology handover command to handover to the second radio access technology.

9. The method according to claim 6, wherein according to the first radio access technology a mobile is not competent to decide on initiating an inter-radio access technology handover, and the apparatus comprises a mobile.

10. The method according to claim 6, wherein responsive to a receiving an inter-radio access technology handover command to another technology than the second radio access technology, the method comprises evaluating the flow management policy and causing the at least one first flow to be transferred to a most preferred radio access technology after the commanded inter-radio access technology handover is completed.

11. A computer program product comprising a non-transitory computer-readable medium bearing computer program code embodied therein for use with a computer, the computer program code comprising:
code for storing a flow management policy;
code for determining, while an apparatus is attached to a first radio access technology, that an inter-radio access technology handover of the apparatus from the first radio access technology to a second radio access technology is likely or imminent, and in response to determining the inter-radio access technology handover is likely or imminent, evaluating the flow management policy in the apparatus to determine a priority order between at least the second and a third radio access technology with respect to at least one first flow active between the apparatus and the first radio access technology; and
code for causing the at least one first flow to be transferred before the inter-radio access technology handover, to the third radio access technology responsive to a determination that for the at least one first flow, the third radio access has higher priority than the second radio access technology, wherein at least one second flow active between the apparatus and the first radio access technology is not caused to be transferred to the third radio access technology.

* * * * *